Oct. 12, 1965  B. W. SORENSON  3,211,482
CONNECTING MEANS FOR TELESCOPING TUBES
Filed Sept. 10, 1962
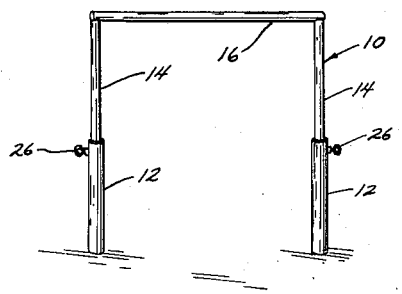
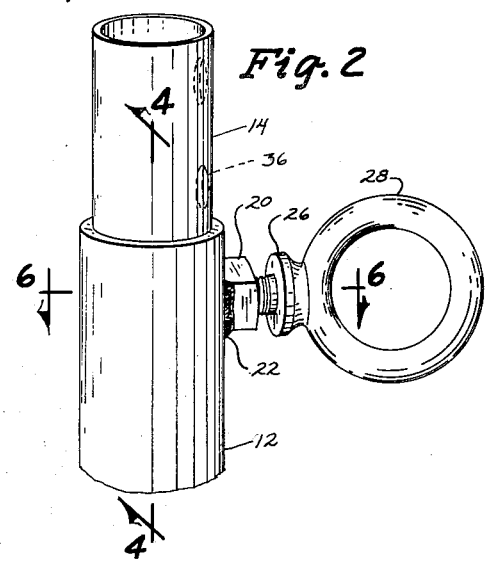
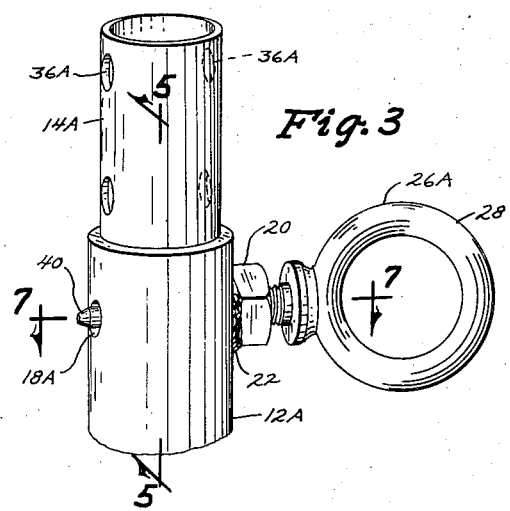
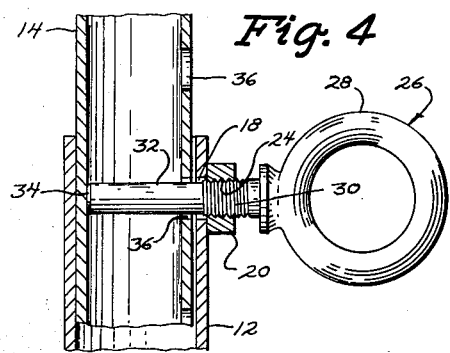
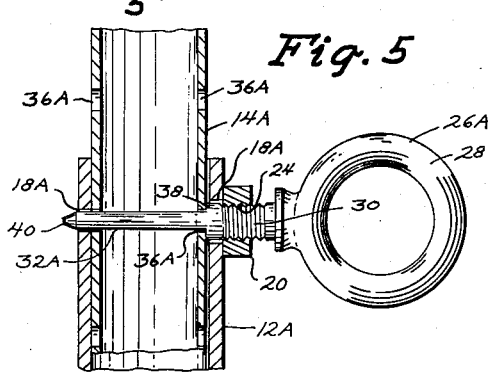
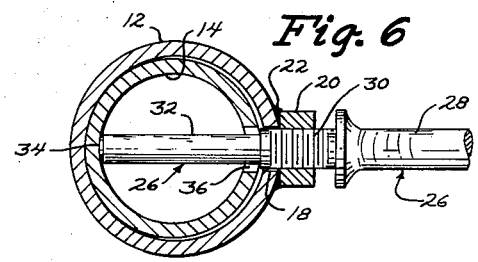
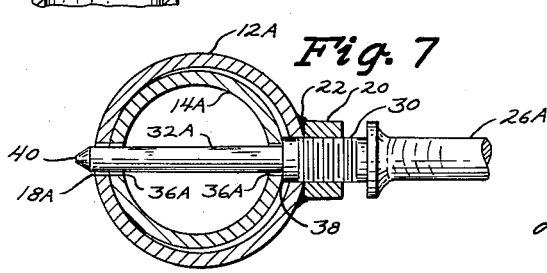
INVENTOR
BILL W. SORENSON
BY
Dick, Zarley & Henderson
ATTORNEYS

United States Patent Office 3,211,482
Patented Oct. 12, 1965

3,211,482
CONNECTING MEANS FOR TELESCOPING TUBES
Bill W. Sorenson, Jefferson, Iowa
Filed Sept. 10, 1962, Ser. No. 222,458
6 Claims. (Cl. 287—58)

The interconnection of telescoping tube sections is important in the gymnastic and playground equipment fields to adjust and dismantle the equipment. The connection of these tube sections must be tight and must be easily operated.

Therefore, the principal object of my invention is to provide a connecting means for telescoping tubes which will prevent relative longitudinal movement between the tube sections involved.

A further object of my invention is to provide a connecting means for telescoping tubes which will prevent any vibratory motion or "play" between the telescoping tube sections after they have been secured together.

A still further object of my invention is to provide a connecting means for telescoping tubes which is easily operated.

A still further object of my invention is to provide a connecting means for telescoping tubes which is completely safe to operate and which renders safe the equipment involved.

A still further object of my invention is to provide a connecting means for telescoping tubes which will be strong and will not cause undue wear on the tube sections involved.

A still further object of my invention is to provide a connecting means for telescoping tubes which will not require any special tools.

Still further objects of my invention are to provide a connecting means for telescoping tubes that is economical in manufacture, durable in use, and refined in appearance.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawing, in which:

FIGURE 1 is a perspective view of a gymnastic device comprised of telescoping tube sections secured together by my device;

FIGURE 2 is a perspective view of my device;

FIGURE 3 is a perspective view of an alternate form of my device;

FIGURE 4 is a sectional view of my device taken on line 4—4 of FIGURE 2;

FIGURE 5 is a sectional view of my device taken on line 5—5 of FIGURE 3;

FIGURE 6 is a sectional view of my device taken on line 6—6 of FIGURE 2;

FIGURE 7 is a sectional view of my device taken on line 7—7 of FIGURE 3.

I have used the numeral 10 to generally designate a gymnastic bar device. Hollow vertical tubes 12 can be secured by their lower ends in any convenient fashion, and hollow tubes 14 are telescopically received in the upper open ends thereof. The means whereby tubes 14 are affixed within tube 12 will be discussed hereafter. A cross bar 16 can be secured in any convenient fashion to the upper ends of tubes 14.

An aperture 18 appears in the side wall of each tube 12 adjacent the upper end of each tube. A nut or shoulder 20 is rigidly secured to each tube 12 adjacent the aperture 18 and is held in this position in any convenient manner such as by weldment 22. Shoulder 20 has a threaded bore 24 which registers with the aperture 18 in tube 12. A pin 26 includes a circular ring 28 on its outer end and a threaded portion 30 adjacent the circular ring. A threaded portion 30 threadably engages the bore 24 in shoulder 20. Pin 26 also has a smooth portion 32 which extends outwardly from the inner end 34 of the pin. A plurality of apertures 36 appear in tube 14 and one of the apertures 36 in tube 14 is adapted to be placed at times in registering positions with an aperture 18 in one of the tubes 12.

As shown in FIGURES 4 and 6, the smooth portion 32 of pin 26 is adapted to be inserted into the registering apertures 18 and 36 in tubes 12 and 14 respectively. The initial insertion of pin 26 into the registering apertures is limited by the engagement of the threaded portion 30 of pin 26 with the threaded bore 24 of shoulder 20. However, the rotation of the pin 26 in one direction effects the further progressive insertion of the pin through the registering apertures. As shown in FIGURES 4 and 6, this insertion of pin 26 through the registering apertures of the tubes 12 and 14 will bring the inner end 34 of the pin into engagement with the interior of tube 14 and force tube 14 laterally into binding engagement with the interior surface of the outer tube 12. Thus, the pin 26 prevents any transverse movement of tube 14 with respect to tube 12, and pin 26 also prevents any relative vertical displacement between the two tubes. The ring portion 28 of pin 26 is easily utilized to manually rotate the pin and children can easily operate the pin without the necessity of any special tools.

In FIGURES 3, 5 and 7, I have shown another form of my invention. This second form of my invention employs elements of similar character to the structure defined above, and where both forms of my invention employ like structure, similar reference numerals have been used.

A tube 14A is adapted to be telescopically inserted into the top of tube 12A in the same manner that tube 14 was inserted into the top of tube 12. Apertures 18A appear in opposite sides of tube 12A and are in horizontal alignment with each other. Similarly, apertures 36A appear in opposite sides of tube 14A and they too are in horizontal alignment with each other. As shown in FIGURES 3 and 5, a plurality of pairs of holes 36A can appear in tube 14A.

A pin 26A is similar to the above described pin 26 except that the smooth portion 32A of pin 26A is longer and of a smaller diameter than the smooth portion 32 of pin 26. The end 40 of pin 26A is adapted to extend through both of the tubes 12A and 14A. The smooth portion 32A of pin 26A creates a shoulder 38 at a point closely adjacent the threaded portion 30 thereof. The diameter of apertures 36A in tube 14A, and the diameter of aperture 18A located in tube 12A on the opposite side of shoulder 20 are all of a similar diameter and all have a smaller diameter than the aperture 18A in tube 12A immediately adjacent the shoulder 20. Thus, the shoulder 38 on pin 26A can easily extend through the aperture 18A immediately adjacent the nut or shoulder 20, but the further movement of the pin 26A through the tube 14A is restricted by the reduced diameter of the aperture 36A which registers with the large aperture 18A.

A pair of apertures 36A in tube 14A are brought into registering position with the apertures 18A in tube 12A. Pin 26A has its end 40 inserted through the pairs of registering apertures and the continued movement of the pin through the two telescoping tubes is further completed by rotating the pin 26A within the shoulder 20 in the manner described above. As this rotation of the pin 26A is continued, the shoulder 38 on pin 26A will engage the tube 14A around the exterior periphery of the aperture 36A in the tube 14A immediately adjacent the enlarged aperture 18A in tube 12A. The engagement of the shoulder 38 with the tube 14A causes the pin 26A to urge the tube 14A laterally within the tube 12A to cause the tubes to enter into a binding engagement with each other. Again, the binding engagement brought about by the pin 26A prevents any lateral displacement of the assembled tubes 14A and 12A.

Obviously, the relative positions of tubes 14 and 14A within tubes 12 and 12A, respectively, can be changed by withdrawing the respective pins 26 and 26A and permitting the apertures in tubes 12 and 12A to register with other sets of apertures in the respective tubes 14 and 14A. The ring 28 on the outer end of each of the pins 26 and 26A permits the pins to be easily rotated without the necessity of a special tool or the like.

From the foregoing it is seen that my invention will permit the rapid and safe adjustment of two telescoping tube sections. It is further seen that the telescoping tube sections are rigidly held against either longitudinal or transverse movement. This structure therefore accomplishes at least all of the stated objectives of this invention.

Some changes may be made in the construction and arrangement of my connecting means for telescoping tubes without departing from the real spirit and purpose of my invention, and it is my intention to cover by my claims, my modified forms of structure or use of mechanical equivalents which may be reasonably included within their scope.

I claim:

1. In a device of the class described,
a hollow tubular member,
a cylindrical member telescopically extending into said tubular member,
said tubular member and said cylindrical member having registering apertures,
said apertures being disposed oppositely in both said tubular member and said cylindrical member wherein the registering apertures in one side of said members will be in alignment with the registering apertures in the other side of said members,
a pin threadably secured to said tubular member and extending into said registering apertures,
said pin being free from threadable engagement with said cylindrical member,
and a bearing surface on said pin and adapted to engage and move said cylindrical member into binding engagement with said tubular member when said pin is rotated in one direction.

2. In a device of the class described,
a hollow tubular member,
a cylindrical member telescopically extending into said tubular member,
said tubular member and said cylindrical member having registering apertures,
said apertures being disposed oppositely in both said tubular member and said cylindrical member wherein the registering apertures in one side of said members will be in diametrical alignment with the registering apertures in the other side of said members,
a supporting shoulder secured to the exterior surface of said tubular member and having a threaded bore registering with said apertures,
a pin threadably mounted in said bore and extending into said apertures,
and a shoulder on said pin adapted to engage the exterior surface of said cylindrical member to urge said cylindrical member into binding engagement with the interior of said tubular member when said pin is rotated in one direction.

3. The structure of claim 2 wherein said shoulder on said pin engages the exterior surface of said cylindrical member in the area adjacent the aperture formed therein opposite the side of said cylindrical member in binding engagement with said tubular member, and said pin includes means on the end thereof adjacent said shoulder for facilitating the rotation thereof manually.

4. The structure of claim 2 wherein said shoulder is circular in cross-section and is concentric with and has a diameter greater than the diameter of said aperture formed in said cylindrical member opposite the side of said cylindrical member in binding engagement with said tubular member, and with the exception of said apertures, said cylindrical member has a continuous construction in transverse cross-section.

5. The structure of claim 2 wherein said shoulder is circular in cross-section and is concentric with and has a diameter greater than the diameter of said aperture formed in said cylindrical member opposite the side of said cylindrical member in binding engagement with said tubular member, and with the exception of said apertures, said cylindrical member has a continuous construction in transverse cross-section, and said pin has sufficient length for it to be rotated to selectively vary the force exerted by said shoulder on said cylindrical member.

6. The structure of claim 2 wherein said shoulder on said pin engages the exterior surface of said cylindrical member in the area adjacent the aperture formed therein opposite the side of said cylindrical member in binding engagement with said tubular member, and said pin includes means on the end thereof adjacent said shoulder for facilitating the rotation thereof manually, and said apertures in said hollow tubular member define a first pair of aligned apertures and said tubular member has at least one other pair of apertures spaced longitudinally therefrom for varying the effective length of said device, said other pair of apertures being diametrically disposed in said tubular member.

References Cited by the Examiner

UNITED STATES PATENTS

| | | | |
|---|---|---|---|
| 658,493 | 9/00 | Trigwell | 285—404 |
| 852,759 | 5/07 | Bergener. | |
| 2,354,806 | 8/44 | Fletcher. | |
| 2,484,401 | 10/49 | Coie. | |
| 2,544,185 | 3/51 | Sargent. | |
| 2,670,917 | 3/54 | Hoffman | 285—302 |

CARL W. TOMLIN, *Primary Examiner.*